United States Patent
Fainveits et al.

(10) Patent No.: US 12,397,935 B2
(45) Date of Patent: Aug. 26, 2025

(54) HYBRID FIXED ANGLE ROTOR UNMANNED AERIAL VEHICLE WITH VERTICAL TAKEOFF AND LANDING CAPABILITIES

(71) Applicants: SIA "FIXAR-AERO", Riga (LV); THE IP LAW FIRM OF GUY LEVI, LLC, Wyckoff, NJ (US)

(72) Inventors: Vasilii Fainveits, Jurmala (LV); Sergei Lobanov, Riga (LV)

(73) Assignee: SIA "FIXAR-AERO", Riga (LV)

( * ) Notice: Subject to any disclaimer, the term of this patent is extended or adjusted under 35 U.S.C. 154(b) by 0 days.

(21) Appl. No.: 18/570,240

(22) PCT Filed: Jun. 15, 2021

(86) PCT No.: PCT/IB2021/055258
§ 371 (c)(1),
(2) Date: Dec. 14, 2023

(87) PCT Pub. No.: WO2022/263879
PCT Pub. Date: Dec. 22, 2022

(65) Prior Publication Data
US 2024/0286772 A1    Aug. 29, 2024

(51) Int. Cl.
*B64U 10/20* (2023.01)
*B64U 20/70* (2023.01)
*B64U 30/29* (2023.01)

(52) U.S. Cl.
CPC ............. *B64U 10/20* (2023.01); *B64U 20/70* (2023.01); *B64U 30/29* (2023.01); *B64U 2201/10* (2023.01)

(58) Field of Classification Search
CPC ........ B64U 10/20; B64U 20/70; B64U 30/29; B64U 2201/10; B60F 5/02; B64C 29/00
See application file for complete search history.

(56) References Cited

U.S. PATENT DOCUMENTS

| | | | |
|---|---|---|---|
| 9,493,235 B2* | 11/2016 | Zhou | G08G 3/02 |
| 10,183,747 B1 | 1/2019 | Longhi et al. | |
| 10,577,091 B2* | 3/2020 | Parks | B64C 39/12 |
| 2016/0114887 A1* | 4/2016 | Zhou | G05D 1/048 |
| | | | 348/148 |
| 2018/0305005 A1* | 10/2018 | Parks | B64C 39/12 |
| 2020/0317332 A1 | 10/2020 | Didey | |

(Continued)

FOREIGN PATENT DOCUMENTS

| | | |
|---|---|---|
| CN | 101885295 A | 11/2010 |
| CN | 212022972 U | 11/2020 |

(Continued)

OTHER PUBLICATIONS

YouTube clip Basics of using xGroundControl Software: (YouTube) dated Oct. 21, 2020, https://www.youtube.com/watch?v=FoKQ2Xvo2hg.

(Continued)

*Primary Examiner* — Benjamin P Lee

(57) ABSTRACT

The disclosure relates to hybrid unmanned aerial vehicle (UAV) having vertical take-off and landing (VTOL) capabilities. Specifically, the disclosure relates to a stable hybrid fixed angle rotor arrays UAV having VTOL capabilities with hovering capabilities using rotors and cruising using fixed wing.

14 Claims, 9 Drawing Sheets

(56) References Cited

U.S. PATENT DOCUMENTS

| | | | | |
|---|---|---|---|---|
| 2022/0306294 A1* | 9/2022 | Baity | .................. | G05D 1/495 |
| 2022/0332413 A1* | 10/2022 | Rallings | .................. | B64C 25/36 |
| 2023/0077891 A1* | 3/2023 | Schafer | .................. | B64U 10/20 |
| | | | | 244/7 R |
| 2023/0271732 A1* | 8/2023 | Weirather | .............. | B64U 10/25 |
| | | | | 244/13 |
| 2023/0382521 A1* | 11/2023 | Huang | .................. | B64U 10/20 |

FOREIGN PATENT DOCUMENTS

| | | | |
|---|---|---|---|
| EP | 3700813 | A1 | 9/2020 |
| JP | 2022148991 | A | 10/2022 |
| WO | 2020141513 | A2 | 7/2020 |
| WO | 2020237082 | A1 | 11/2020 |

OTHER PUBLICATIONS

YouTube clip FIXAR007: Unpacking, dated Dec. 28, 2020, https://www.youtube.com/watch?v=xmmssiglyPA.

* cited by examiner

HYBRID FIXED ANGLE ROTOR UNMANNED AERIAL VEHICLE WITH VERTICAL TAKEOFF AND LANDING CAPABILITIES

BACKGROUND

The disclosure is directed to a hybrid unmanned aerial vehicle (UAV) having vertical take-off and landing (VTOL) capabilities. Specifically, the disclosure is directed to a hybrid fixed and rotating wings UAV having VTOL capabilities.

Currently, UAVs are developed to complete a wide range of specialized tasks, such as, for example, combat, surveillance, delivery, search and rescue operations, industrial surveying and inspection, construction, mining, stockpiling, photogrammetry, aerial photography, cinematography, and video, live streaming, newsgathering, multispectral analysis, for vegetation, biological plant protection, asset perimeter inspection, transmission lines and pipelines inspection, interception of other UAVs, geodesy and cartography and other.

Typically, these UAVs were developed as multipurpose carrying platforms, to carry variable freight and/or payload. But any special application of UAV depended on special functional conditions and requirements, which in turn, are determined by the UAV's principal design solutions (design for X, or DFX). Among UAVs' determining DFX requirements are factors such as, flight duration, cruising altitude, payload type and weight, hovering ability and the like.

However, many types of applications for UAV require level cruising flight for a substantial distance, simultaneous with VTOL ability. VTOL ability is especially relevant when there is no dedicated runway, and accommodation of such runway is impossible due to the absence of clear landing space, for example in urban environment, marine vessels, drilling platforms, substantially uneven terrain etc.

In the art are known convertible aircrafts of several structural types that have been used in manned aviation, differing in the principles of flight in various modes. In particular, the so-called "convertiplane" are known, consisting of two rotor systems-lifting and cruising, each ones work in only one mode. The disadvantage of mentioned design is relatively high weight of propulsion unit, and degradation of aerodynamic characteristics caused by creation of additional drag of non-active rotors.

Likewise, there are known so-called "tiltrotors", providing variable flight modes by rotating (tilting) rotors from vertical position to horizontal configuration for the level cruising flight. Also there are known aerial vehicles providing variable flight modes by rotation of wing parts, on which rotors are mounted.

The disadvantage of the above mentioned structures of UAV is the instability of flight in transition modes, the structural complexity and high weight of the drivetrains providing rotation (tilting) rotors or wing parts. The mentioned structures are also poorly scaled, since with an increase in mass-dimensional characteristics, the pitch, roll and torque moments of rotors increase, which must be overcome structurally relative to the vertical flight plane.

Likewise, there are known so-called "tail sitter" VTOL, which have also been used in UAVs, however, as a rule, have a small relative carrying capacity and that are challenging to operate in circumstances of high cross winds in takeoff, landing and hovering modes.

Thus, the common disadvantages of the above-mentioned designs can be summarized as a) instability of the flight of the aircraft when making the transition from vertical to level cruising flight mode and back, as well as b) the difficulty of balancing the center of gravity of the aircraft, c) the complexity of control, and d) low reliability.

Examples for the above solutions are disclosed, inter alia in WO 2015/115913 A1, entitled "Multipurpose aircraft", having twin fuselage configuration with front and rear structural member panels, which are located between fuselages, wherein the front structural member panel includes a nacelle having compartment for storage and an engine. The front structural member panel described is part of the fixed wing assisting in balancing the lift of the aircraft.

Additionally, U.S. Pat. No. D822,579, design of aircraft, comprises a cabin with attached right and left wing consoles, right and left longitudinal beams attached by front outstanding struts to the cabin and coupled together by airfoil element behind the cabin, motor with pushing rotor positioned on the back of the cabin, wherein each longitudinal beam includes row of four rotors for hover mode, vertical stabilizer positioned on the back of beam behind the cabin, landing gears. The disadvantage of aircraft shown, is that the one include two groups of rotors-one pushing rotor, positioned on the back of the cabin, to provide level cruising flight of the aircraft and two rows of rotors positioned on right and left beams, to provide hovering mode of the aircraft, thus increasing the weight of the aircraft and reducing energy efficiency and range.

Likewise, U.S. Pat. No. 9,296,478 B2 entitled "Aircraft having at least two aircraft fuselages and a structural member with arrangement with at least two wing sections that are not connected to each other", includes a structural member arrangement with at least two non-connected wing sections, and a second wing, wherein connecting regions of the structural member arrangement and of the second wing are arranged so as to be offset relative to each other at least on an X-Z-plane on an aircraft-fixed coordinate system. The aircraft described in U.S. Pat. No. 9,296,478 B2 is a full-scaled passenger airplane providing level cruising flight, without vertical takeoff and landing capabilities.

These and other shortcomings of the existing technology are sought to be resolved herein.

SUMMARY

Disclosed, in various exemplary implementations, are hybrid unmanned aerial vehicles (UAVs), having vertical take-off and landing (VTOL) capabilities. Specifically, provided are exemplary implementations of hybrid fixed and rotating wings' UAV having VTOL capabilities with increased stability.

In an exemplary implementation, provided herein is an unmanned aerial vehicle (UAV) system configured for Vertical Take-Off and Landing (VTOL), comprising an aircraft having: a pair of elongated arcuate drivetrain members, each having a basal end and an apical end and each defining a basal, mid, and apical inflection points; a fuselage; a structural member defining a longitudinal axis, having an upper surface and a basal surface, with a pair of lateral ends extending laterally from the fuselage and coupled to each of the elongated arcuate drivetrain members at each lateral end; a pair of second wings, operably coupled to, and extending laterally from each elongated arcuate drivetrain members, each second wing operably coupled to the structural member; a rear horizontal inverted airfoil, having apical surface and a basal surface spanning the gap between the pair of elongated arcuate drivetrain members, with lateral ends coupled to the pair of elongated arcuate drivetrain members at the apical inflection point; and optionally, a stabilizing cross bar having a pair of lateral ends coupled to the corresponding elongated arcuate drivetrain member at the basal inflection point, wherein each elongated drivetrain member further comprises a first VTOL rotor extending apically from the basal inflection point and a second VTOL rotor extending basally from the elongated arcuate drivetrain member between the mid inflection point and the apical inflection point.

In another exemplary implementation, provided herein is an autonomous VTOL UAV comprising: a first autopilot module transceiving UAV rotor control signals; a second autopilot module receiving fixed wing control signals; an integrator module; and an on-board central processing module (CPM) in communication with the first autopilot module, the second autopilot module, and the integrator module, the CPM comprising at least one processor, and being in further communication with a non-transitory memory device storing thereon a set of executable instructions, configured, when executed to cause the at least one processor to automatically: transceive the rotor control signals; receive the fixed wing control signals; using the integrator module, calculate control signals to be applied to the VTOL UAV; and apply said calculated control signals to said VTOL UAV rotor controls.

These and other features of the systems, methods and programs of the hybrid fixed and rotating wings UAV having VTOL capabilities, will become apparent from the following detailed description when read in conjunction with the figures and examples, which are exemplary, not limiting.

BRIEF DESCRIPTION OF THE FIGURES

For a better understanding of systems, methods and programs of hybrid fixed and rotating wings UAVs having VTOL capabilities, with regard to the exemplary implementations thereof, reference is made to the accompanying examples and figures, in which.

DETAILED DESCRIPTION

Provided herein are exemplary implementations of systems, methods and programs of hybrid fixed and rotating wings UAV having VTOL capabilities. In certain exemplary implementations, the disclosed hybrid fixed and rotating wings UAV having VTOL capabilities, provides improved controllability, having seamless transitioning between hover and level cruising flight modes. The seamless transitioning between hover and level cruising flight modes is achieved, for example, by rotors mounted with fixed angle deflection in two arrays, wherein one array of front rotors are mounted with upward (apical) direction, and next array of rear rotors are mounted with downward (basal) direction, and the center of gravity of the UAV is located at the intersection of the diagonals of the rotor axes. The location of the center of gravity of the UAV and the values of the angles of rotor's deflection are determined by the equation provided herein.

Figure 1A:
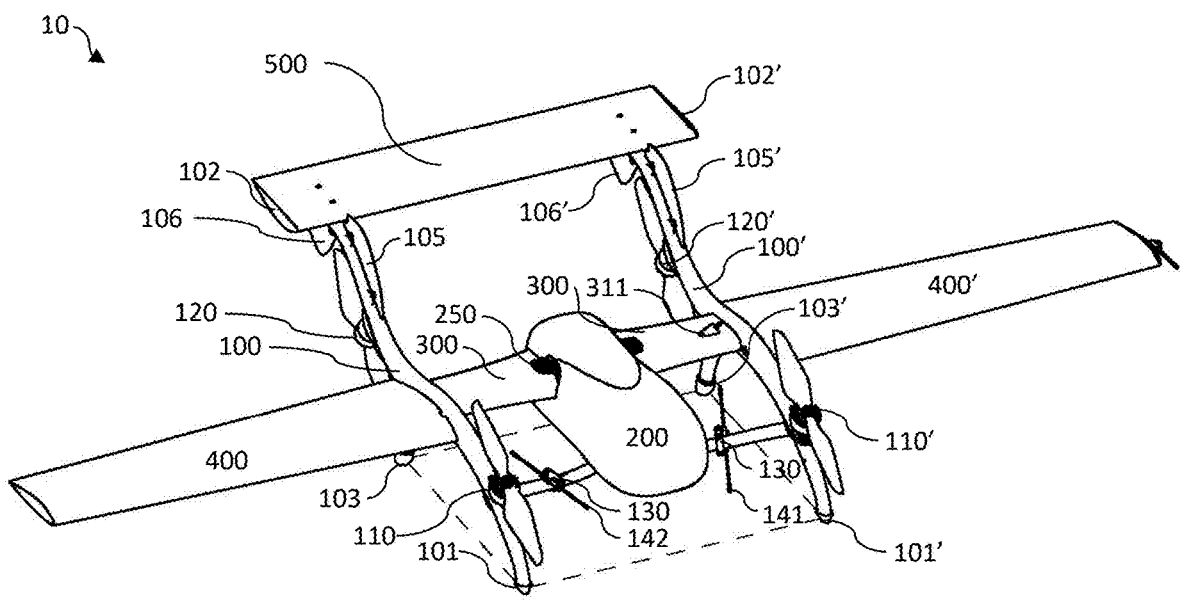
FIG. 1A, illustrates a top perspective view of an exemplary implementation of the UAV with VTOL capabilities, with FIG. 1B, illustrating a bottom perspective view thereof.

As illustrated in an exemplary implementation in FIGS. 1A, IB, Front wing arrangement with first rotors array and rear horizontal stabilizer (in other words, the inverted air foil) with second rotors (rotors) array affects two reacting thrust components, such that air lift area of front wing arrangement is larger than the lift generated by the rear horizontal stabilizer air lift area, creating a self-stabilizing aerodynamic system. In the configuration illustrated, the control of the UAV increases the nose pitch while decreasing downthrust by employing a functional elevator with a dedicated drive (rear rotor array). In the context of the disclosure, the term "rotor" is used to include rotors, propellers and any other suitable rotating blade or blade-type structure that imparts a force to a vehicle via interaction with the surrounding medium, be it air or fluid. Multi rotor UAV 10 can include multiple subsystems, for example an avionics subsystem, a genset subsystem, one or more of electronic speed controllers (ESCs) drive motors that drive one or more rotors (e.g., propellers). In some exemplary implementations, a drive motor is "coupleable" to a rotor/propeller. That is, the drive motor is adapted in a structure that is capable of being coupled to the rotor/propeller.

Accordingly, provided is a hybrid UAV with VTOL capabilities, with two separated load bearing longitudinal elements, at least one front horizontal wing arrangement, rear horizontal stabilizer, multirotor propulsion unit, and fuselage for payload and other equipment. In certain exemplary implementations, the front wing arrangement comprises right and left separated wing parts without center wing section, which are mounted on outsides of the load bearing longitudinal drivetrain elements. In addition, the load bearing longitudinal drivetrain elements are optionally interconnected to each other by at least one transverse cross-bar stiffener.

Figure 1B:
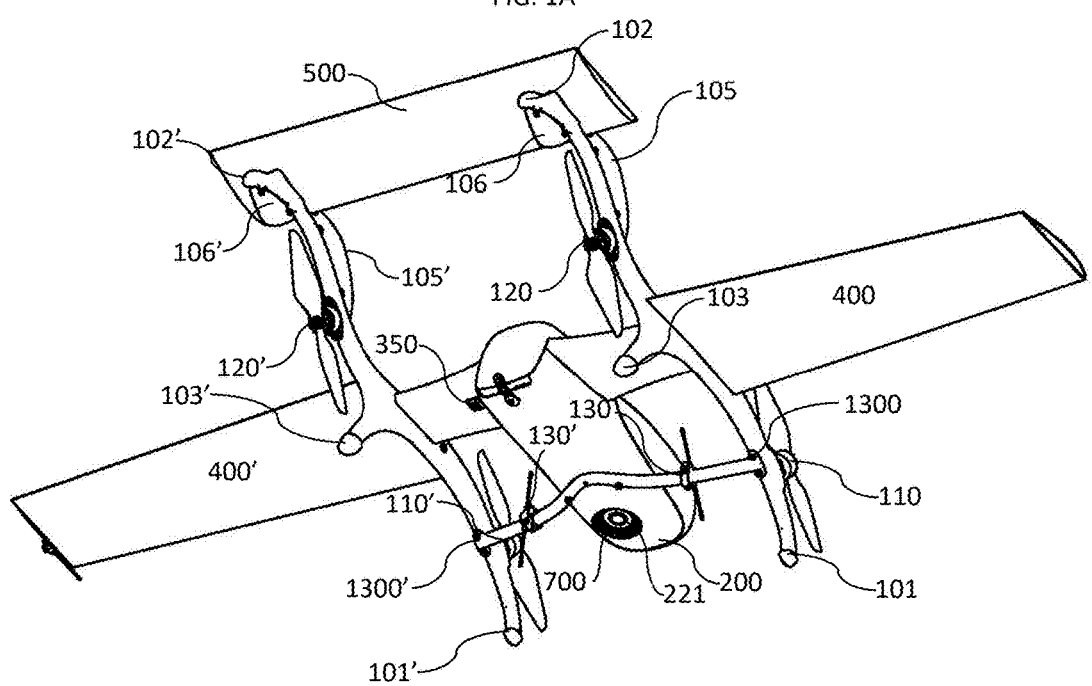

In the context of the disclosure, the term "transverse stiffener", or "stabilizing cross bar" means a rod, bar or beam, or structure operable to provide for transverse stiffness of the front wing arrangement. The element is optionally included and its inclusion will depend on predetermined factors, such as payload weight, expected atmospheric conditions, and the like. As illustrated in FIG. 1B, the arcuate, flared V-shape cross bar is sized such that the apex of the V-shape stabilizer is located directly beneath the UAV's center of gravity, thus providing additional stability to the UAV. Likewise, in the context of the disclosure, the term "longitudinal element", or "elongated arcuate drivetrain members" refer to load bearing element, operable for providing structural stiffness and for mounting equipment or for empennage. The term "drivetrain" means the mechanical, and electrical parts which interconnect the rotors mounted on the elongated arcuate drivetrain members to the power source.

In the context of the disclosure, the term "operable" means the system and/or the device and/or the program, or a certain element or step is fully functional, sized, adapted and calibrated, comprises elements for, and meets applicable operability requirements to perform a recited function when activated, coupled, implemented, actuated, effected, realized, or when an executable program is executed by at least one processor associated with the system and/or the device. In relation to systems and circuits, the term "operable" means the system and/or the circuit is fully functional and calibrated, comprises logic for, having the hardware and firmware necessary, as well as the circuitry for, and meets applicable operability requirements to perform a recited function when executed by at least one processor.

In another exemplary implementation, the multirotor propulsion unit comprises at least four rotors (interchangeable with rotors). The rotors can be located at least in two arrays, the first array ahead of the front wing arrangement and the second array forward from the horizontal stabilizer. The rotors are mounted on longitudinal drivetrain elements, with fixed deflection angle biio, $b_i 20$ and with a predetermined gap from the leading edge of the front wing arrangement and below the low pressure zone of the rear horizontal stabilizer. The rotational axes of first array of rotors are directed upward, and the rotational axes of second array of rotors are directed downward.

Furthermore, the UAV further comprises rear horizontal stabilizer (or, rear horizontal inverted airfoil) comprised of spoiler and optionally, in certain exemplary implementations, elevator with drive. The spoiler being inverted and being operable to create a downward directed aerodynamic force (downthrust force). Moreover, the air gap between airfoils and rotors' tips sized and adapted to minimize distortion of the air flow created by the rotors and the airflow above and below the fixed wing assembly and the rear horizontal inverted airfoil.

Figure 6A:
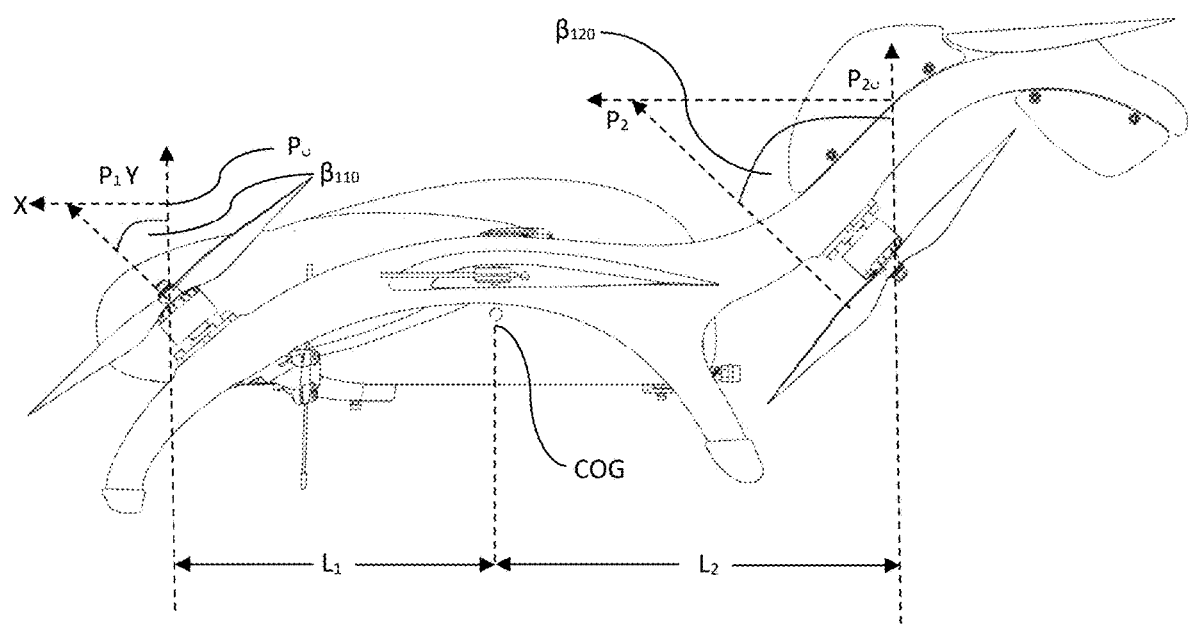
FIG. 6A, illustrating side view of UAV in level cruising flight mode position with FIG. 6B, illustrating the UAV hovering at vertical landing and takeoff.
Figure 6B:
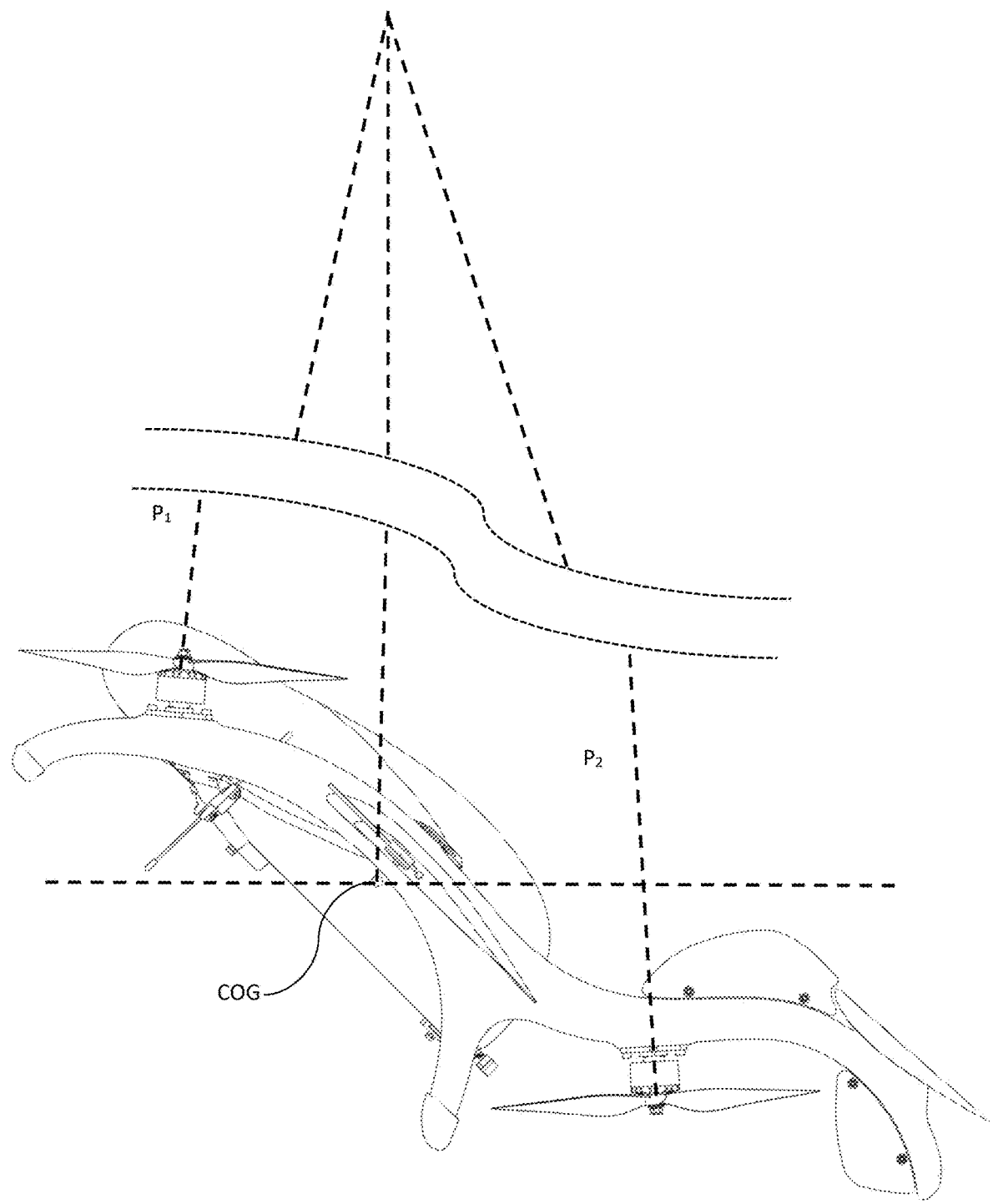

As further illustrated, e.g., in FIG. 6B, the UAV's center of gravity during vertical takeoff and landing is disposed directly beneath the intersection of diagonals drawn through the rotational axes of the rotors in each elongated arcuate drivetrain member, though not forming a pyramid, but rather on each side of the fuselage, thereby creating two intersecting components of thrust, acting to stabilize the UAV on VTOL mode.

As illustrated in FIGS. 6A, 6B, the fixed deflection angle of the rotor's are operable to provide flight stability in both hovering and level cruising flight of the UAV. The stability, provided by the UAV systems disclosed, is determined using the following equation:

$$\begin{cases} P_{1v} = P_{2v} \\ \cos \alpha = \kappa \times \cos \beta \\ \kappa = \dfrac{L_2}{L_1} \end{cases} \quad \text{(EQU 1)}$$

Wherein:—$P_{1v}$, $P_{2v}$—are vertical thrust components of front 110, 110' and rear 120, 120' rotors;

L1, L2, —moment arms laid between axes of vertical thrust components and center of gravity (COG);

$\beta_{110}$, $\beta_{120}$—estimated values of angles of design deflection of rotors, producing normal rotor thrust $P_{1n}$, $P_{2n}$; and k—design factor As indicated, during hovering mode, stability is provided by convergence of thrust vectors of front 110, 110' and rear 120, 120' rotors in intersection point over the UAV, while the UAV's COG is disposed below the intersection point as shown in FIG. 6B.

In certain exemplary implementation, the fuselage further comprises auto piloting system and a gondola, for example, for mounting imaging module equipment, or for storing another payload.

It is contemplated, that the UAV disclosed, can be scaled up to be manned aerial vehicle, operable to carry personnel, passengers and crew, as well as payload.

A more complete understanding of the components, and devices disclosed herein can be obtained by reference to the accompanying drawings. These figures (also referred to herein as "FIG.") are merely schematic representations based on convenience and the ease of demonstrating the present disclosure and are, therefore, not intended to indicate relative size and dimensions of the devices or components thereof, their relative size relationship and/or to define or limit the scope of the exemplary implementations. Although specific terms are used in the following description for the sake of clarity, these terms are intended to refer only to the particular structure of the exemplary implementations selected for illustration in the drawings, and are not intended to define or limit the scope of the disclosure relative to the rest of the specification. In the drawings and the following description below, it is to be understood that like numeric designations refer to components of like function. Likewise, cross sections are referred to on normal orthogonal coordinate system having XYZ axis, such that Y axis refers to front-to-back, X axis refers to side-to-side, and Z axis refers to up-and-down.

Turning now to FIGS. 1 A-5B, illustrating unmanned aerial vehicle (UAV) system configured for Vertical Take-Off and Landing (VTOL), comprising: aircraft 10 comprising: pair of elongated arcuate drivetrain members 100, 100', each having basal end 101, 101' with basal pad 1010, 1010' optionally coupled, and apical end 102, 102' and each defining basal 1001 (see e.g., FIG. 2), mid 1002, and apical 1003 inflection points; fuselage 200; structural member 300 defining longitudinal axis A/, (See e.g., FIGS. 3A, 3B) having upper surface 3003 and basal surface 3004, with pair of lateral end caps 3001, 3002 coupled to lateral sections 3006, 3007 extending laterally from fuselage 200 and coupled to each of elongated arcuate drivetrain members 100, 100' at each lateral end-cap 3001, 3002 respectively. Also illustrated, are pair of second wings 400, 400', operably coupled to, and extending laterally from each elongated arcuate drivetrain members 100, 100', each second wing 400, 400' operably coupled to structural member's 300 via, for example at least one tube 319A, 329A operable to couple the components through apertures 1009A, 1009A', with opening 1008 (1008') (See e.g., FIG. 2) defined in each elongated arcuate drivetrain member 100, 100' being used for example, for wirings.

Figure 7:
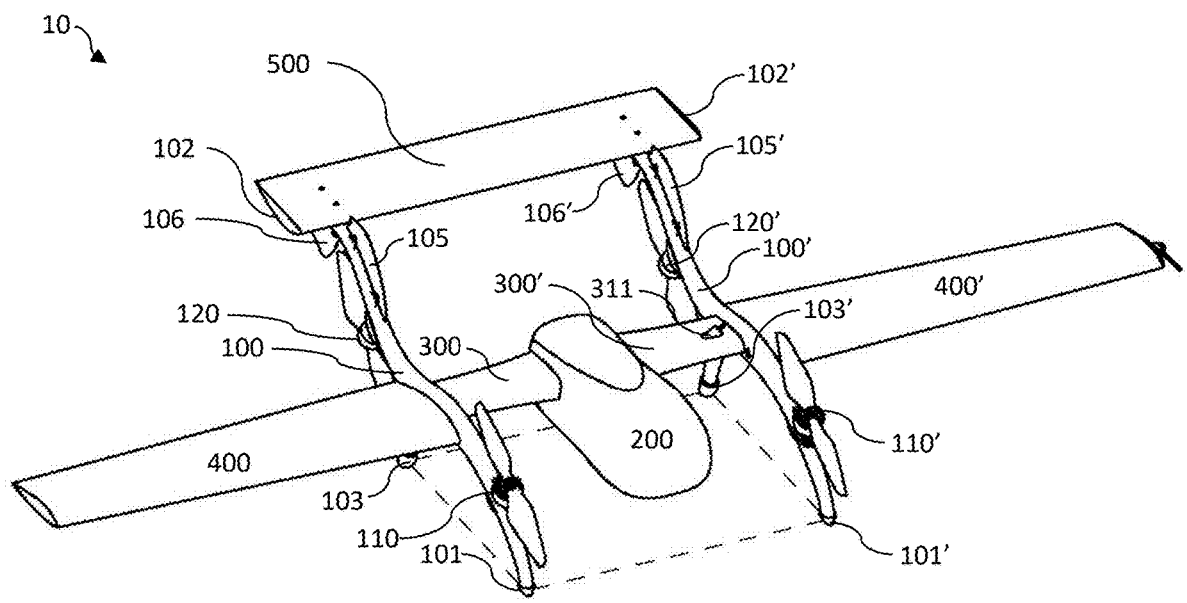
FIG. 7, illustrates a top perspective view of another exemplary implementation of the UAV with VTOL capabilities, without the stabilizing cross-bar and the autopilot radiator illustrated in FIG. 1A.

UAV 10 further comprises rear horizontal inverted airfoil 500, having leading edge 5003 and trailing edge 5004, with apical surface 5001 and basal surface 5002 spanning the gap between the pair of elongated arcuate drivetrain members 100, 100', with lateral ends 5005, 5005' coupled to pair of elongated arcuate drivetrain members 100, 100' at or about apical inflection point 1003 (see e.g., mounting pad 1006, FIG. 1B). Also shown is optional, stabilizing cross bar 130 having pair of lateral ends 1300, 1300' (see e.g., FIGS. 1A and 1B) coupled to corresponding elongated arcuate drivetrain member 100, 100' at or about basal inflection point 1001, wherein each elongated drivetrain member 100, 100' further comprises first VTOL rotor 110, 110' extending apically from basal inflection point 1001, 100G and second VTOL rotor 120, 120' extending basally from elongated arcuate drivetrain member 100, 100' between mid-inflection point 1002, 1002' and apical inflection point 1003, 1003'. As illustrated in FIG. 7, under certain circumstances, stabilizing cross bar 130 is not incorporated into the system, and therefore reduce the weight (thus increasing the range) of the UAV.

Figure 2:
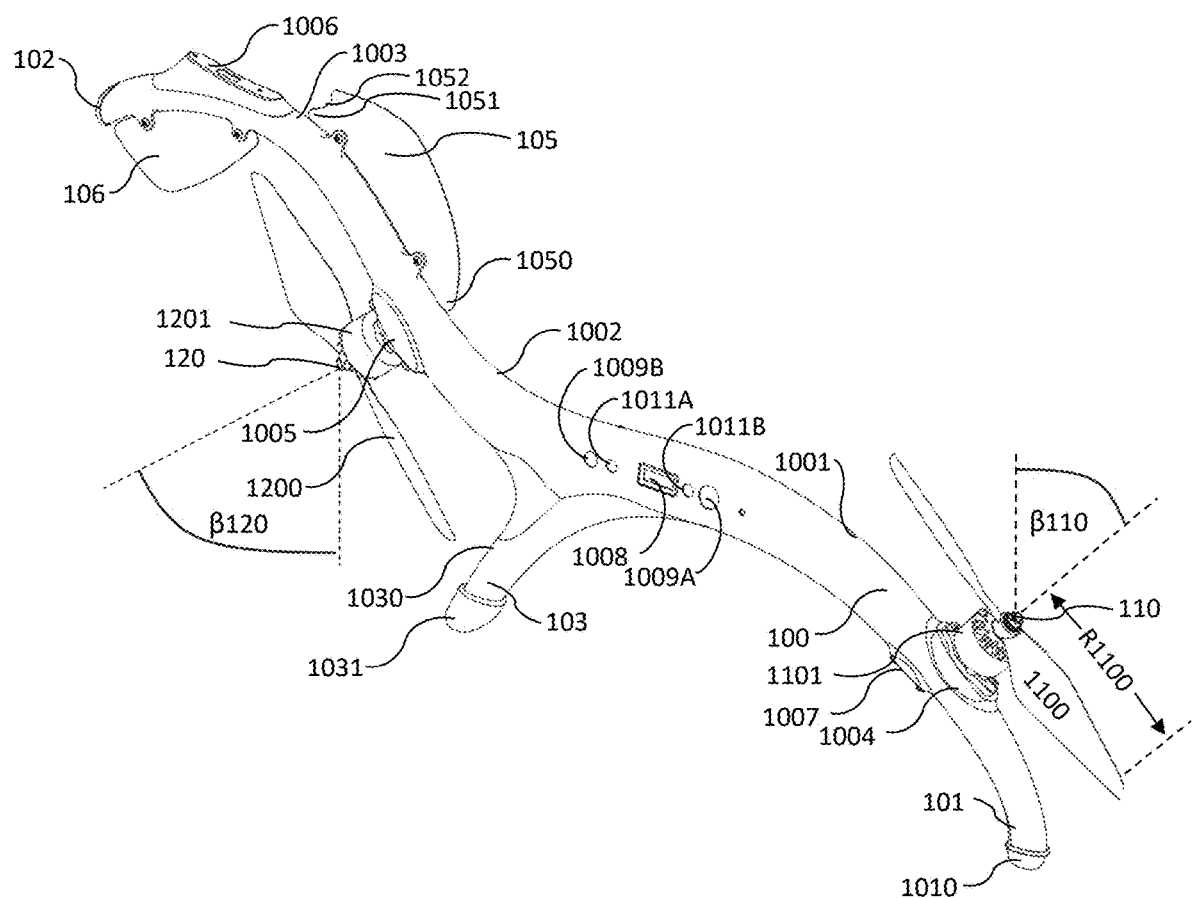
FIG. 2, illustrates one of a pair of the drivetrain members.

Moreover, and as illustrated in FIG. 2, each elongated arcuate drivetrain member 100, 100' further comprise dorsal vertical stabilizer (vertical air foil) 105, 105' extending dorsally from mid inflection 1002, 1002' point to apical inflection point 1003, 1003', and ventral horizontal stabilizer 106, 106' disposed between apical infection point 1003, 1003' and apical end 102, 102'. Moreover, and as illustrated in FIG. 2, each elongated arcuate drivetrain member 100, 100' further comprises support member 103, 103' having basal end 1031, 1031' (for example, a pad) extending basally from mid inflection point 1002, 1002', operable to form level base plane 101, 101', 103', 103 at level cruising flight and a level plane 103, 102, 102', 103' upon VTOL (see e.g., FIG. 6B). The elongated arcuate drivetrain members 100, 100' can be monolithic light weight hollow body structure, made of, for example, polypropylene, ABS plastic, or a carbon fiber/Kevlar composite.

As further illustrated, rotors 110, 110' 120, 120' are disposed at predetermined deflection angles bpo, bho such that at takeoff, while plane 103, 102, 102', 103', the projected diagonal formed from the rotational axis of each rotor 110, 120, 110', 120', intersects normal to the UAV center of gravity. In an exemplary implementation, bho can be, for example between about 45° and about 47°, while bho can be between about 41° and about 43°, such that first VTOL rotor 110, 110' and second VTOL rotor 120, 120', each extend from elongated arcuate drivetrain member 100, 100' at predetermined deflection angle bpo, $b_i 20$ off vertical, and wherein second VTOL rotor 120, 120' extends from elongated arcuate drivetrain member at larger deflection angle fim than first VTOL rotors '110, 110' deflection angle bho,. Furthermore, depending on various parameters, such as VTOL altitude, payload weight, atmospheric conditions and the like, the rotor blades can be replaced from, for example in one exemplary implementation 25.4 cm. diameter with a step of about 11.4 cm., to a rotor having a blade diameter of about 28 cm. with a step of about 11.4 cm. As further illustrated in FIG. 2, each rotor 110, 110', 120, 120' are mounted on corresponding mounting pads 1004, 1005, 1004', 1005'.

Figure 3A:
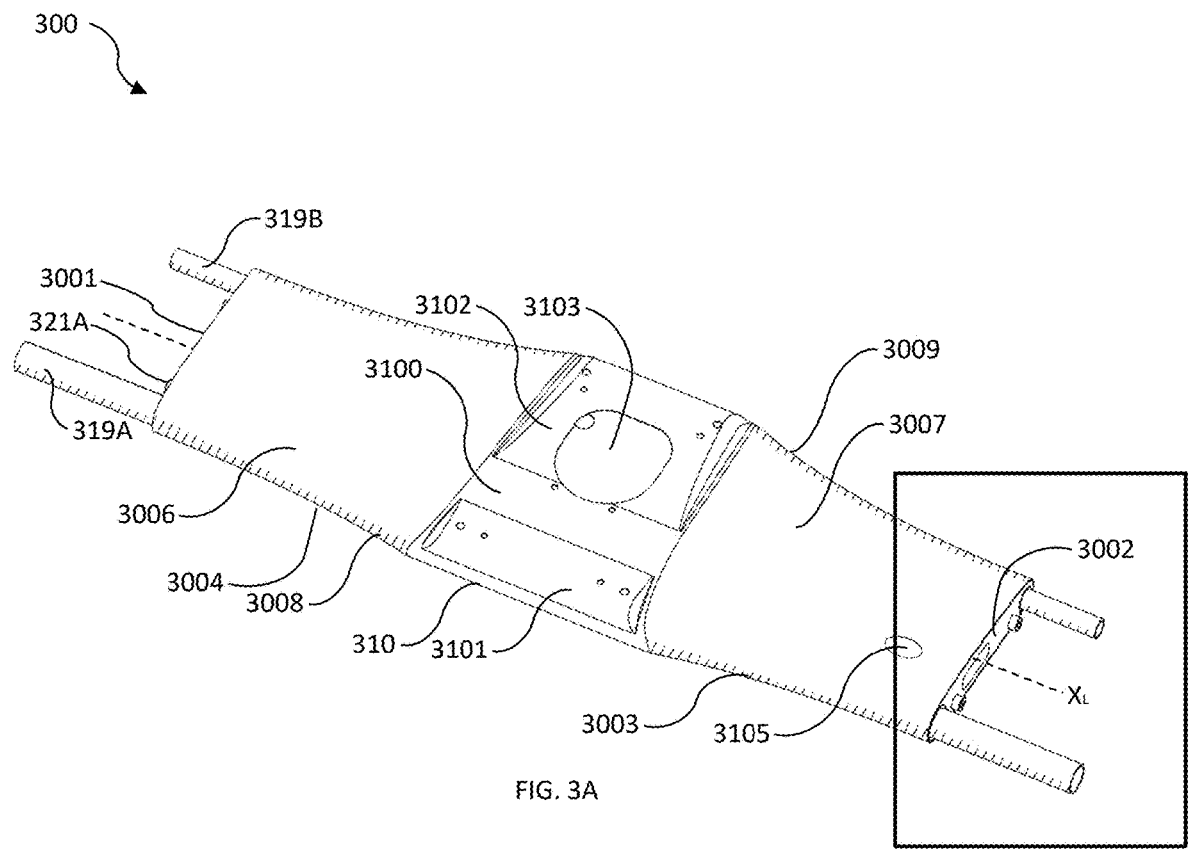
FIG. 3A illustrating a top perspective view of the structural member element, with FIG. 3B, illustrating an enlarged portion.
Figure 3B:
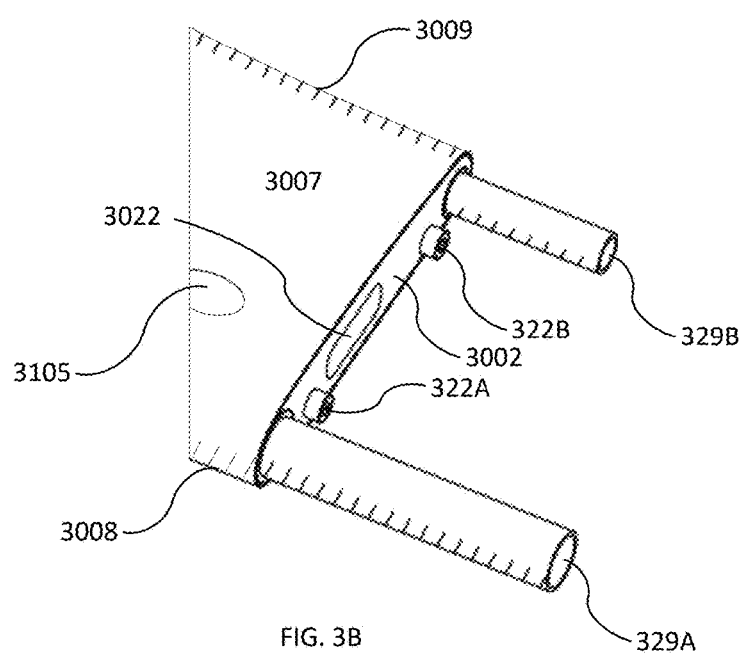
Figure 4A:
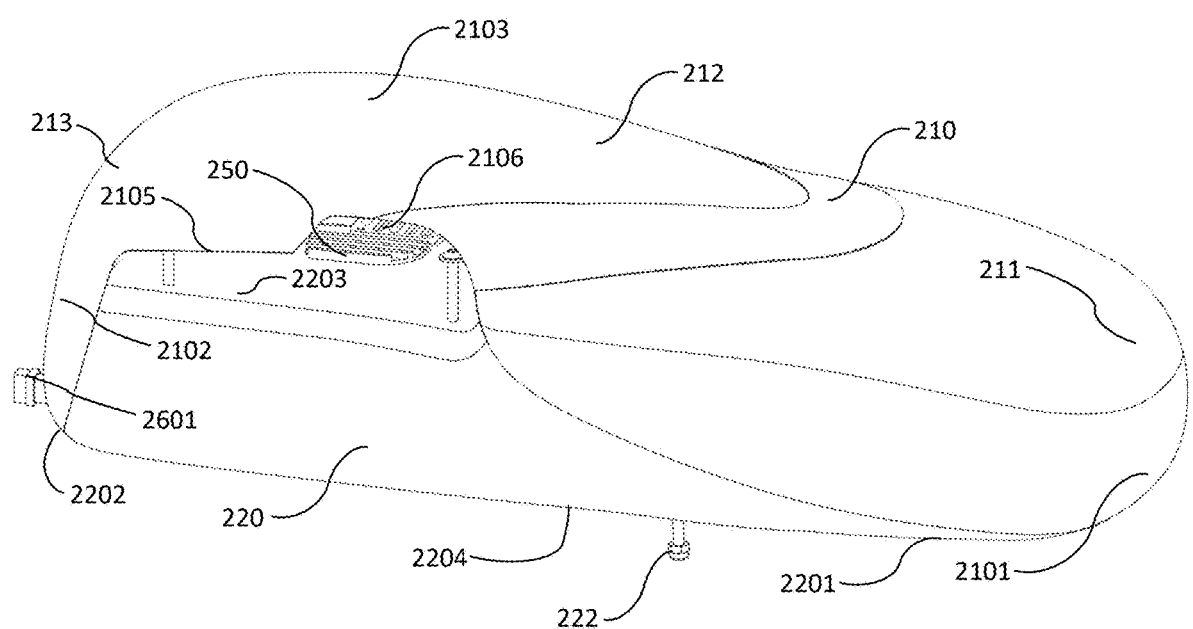
FIG. 4A, illustrating a top perspective view the fuselage element of the UAV, with FIG. 4B, illustrating a bottom perspective view thereof, and FIG. 4C, illustrating the gondola portion of the fuselage, without the covering member.

Turning now to FIGS. 2-3B, illustrating (aerodynamically contoured) structural member 300, having lateral end caps 3001, 3002 with leading edge 3008 and trailing edge 3009 further defining central region 310 and pair of lateral sections 3006, 3007 tapering away from central region 310, while upper surface 3100 of central region 310 further defines front portion 3101 and rear portion 3102, rear portion 3102 further defining opening 3103, operable to accommodate equipment and communicate with fuselage covering 210 (see e.g., FIG. 4A). As illustrated in FIG. 3A front portion 3101 and rear portion 3102, are raised over upper surface 3003 of structural member 300, forming a predetermined topology. Also illustrated in FIG. 3B, is aperture 3105, operable to provide access to structural member 300, for coupling of various elements, such as pressure sensors and the like (311, see e.g., FIG. 1A), for example, downward looking LIDAR 350 (see e.g., FIG. 1B).

As further illustrated in FIGS. 2, 3 A, and 3B, each end-cap 3001, 3002 is operable to accommodate tubes 319A, 319B, 329 A, 329B sized, adapted and configured, in certain exemplary implementation, to couple second wing section 400, 400', through apertures 1009A, 1009B, 1009A',

1009B'. Likewise, bores 1011A, 1011B, 1011A', 1011B' are configured to accommodate retainers 321A, 321B, 322A, 322B (e.g., screws, detents, thus coupling structural member 300 to each elongated drivetrain member 100, 100'. As illustrated further, each end-cap 3001, 3002 further defines opening 3021, 3022, configured to allow passage between second wings 400, 400' and fuselage 200, doe example, wiring.

Figure 4B:
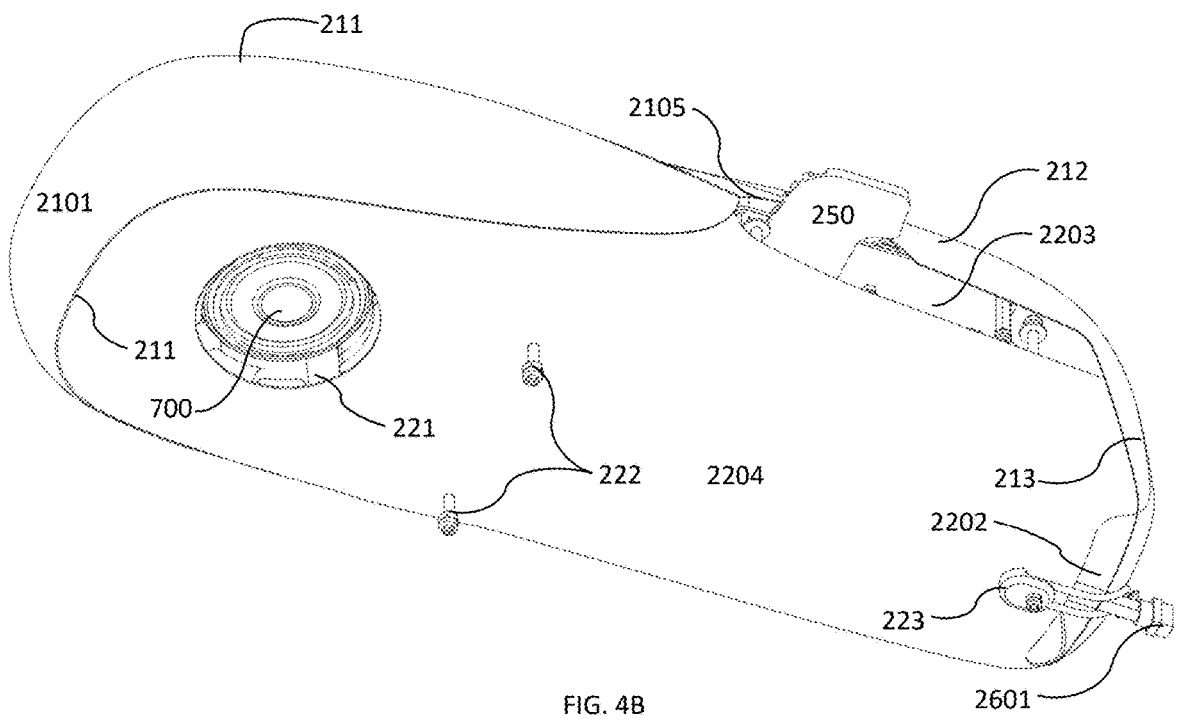
Figure 4C:
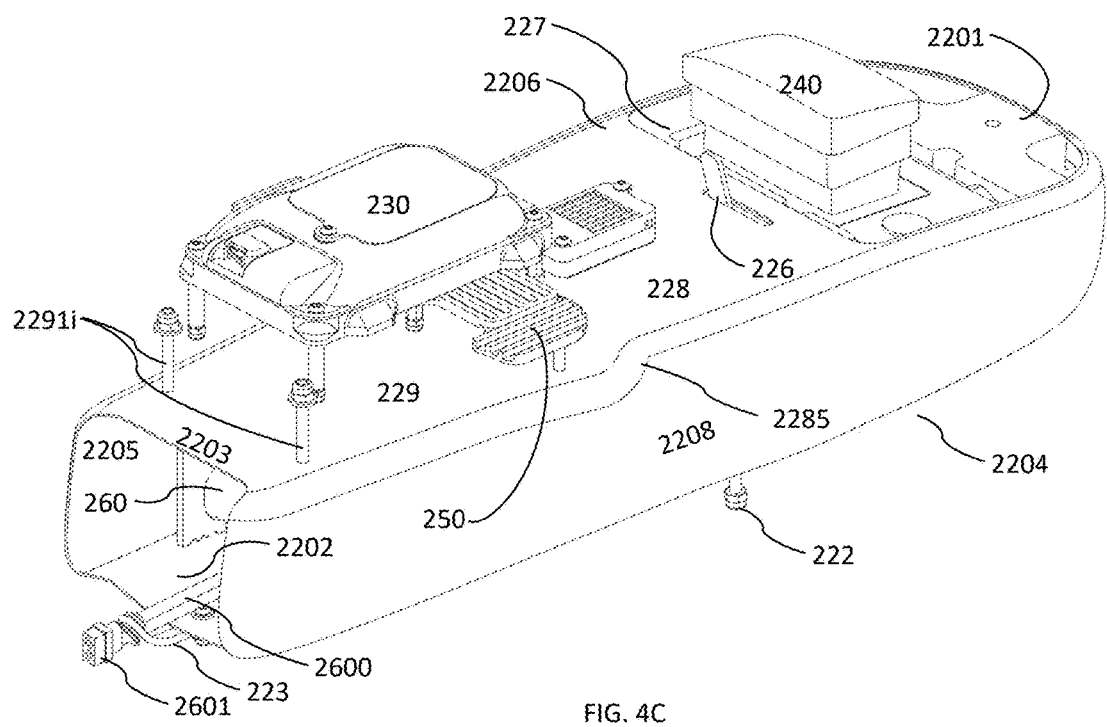

Turning now to FIGS. 4A-4C, illustrating fuselage 200 comprising: basally open covering member 210; and gondola 220, together forming a nacelle. As illustrated, basally open covering member 210 having anterior end 2101 and posterior end 2102 comprises nose section 211, canopy section 212 and backing section 213 together defining lip 2105, lip 2105 forms an opening sized and adapted to accommodate central region 310 topology formed of front portion 3101 and rear portion 3102 of structural member 300 between covering member 210 and gondola 220, while gondola 220 comprises: posteriorly open aft portion 2202, forming compartment 2205 operable to accommodate power unit 260; with apically open fore portion 2206, forming payload chamber, aft portion 2205 separated from fore portion 2206 by bulkhead 2207 (not shown).

Also shown in FIGS. 4B, are optional opening 221, which can be used to enable imaging module 700 to observe the ground. Also illustrated in FIG. 4B, are means 222 for coupling gondola 220 having basal surface 2204, to transverse stabilizing bar 130 (see e.g., FIG. 1A). The coupling means can be any suitable means, such as screws, rods, detents, zip ties, and the like. As further illustrated in FIG. 4C, gondola 220, having anterior end 2201, posterior end 2202, basal surface 2204, and apical surface 2203 with side walls 2208, is configured in certain exemplary implementation to have upper deck 228 and lower deck 229, separated by step 2285. Apically open fore section 2206, further shows payload 240 (here a camera clamp, but could be other payload type), with power unit releasing lever 226 and modem 227 operable to communicate with the ground control station in certain exemplary implementations. Lower deck 229, further shows autopilot module 230 with cooling radiator 250 coupled to lower deck 229, as do coupling means 2291i, operable to couple gondola 220 to structural member 300 central portion 310. Charging port 2601, as well as leads 2600 to power unit 260 are also shown as is closure clasp 223. While autopilot 230 provides autonomous flight capabilities. In certain other exemplary implementations, the UAV can be remote controlled and radiator 250 will become unnecessary as further illustrated in FIG. 7.

Figure 5A:
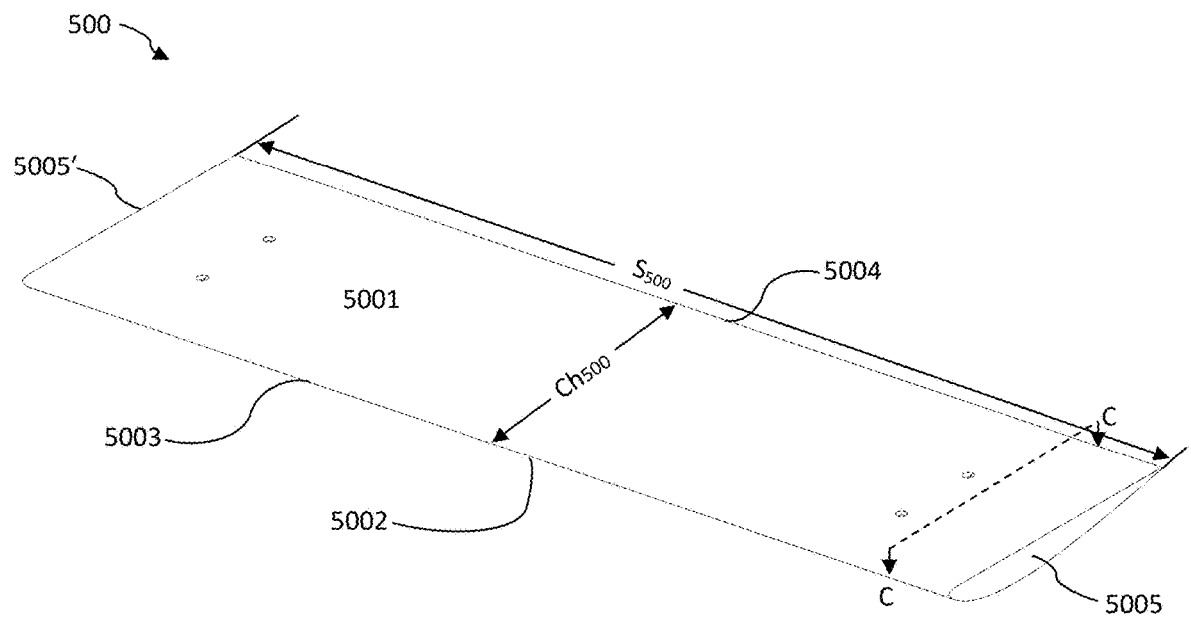
FIG. 5A, illustrating the inverted air foil of the UAV, with FIG. 5B, illustrating a Y-Z cross section taken along line C-C of FIG. 5A.
Figure 5B:

Turning now to FIG. 5 A, 5B, illustrating rear horizontal inverted airfoil 500 having negative angle of attack, of between about −1.0° and −5.0°, for example, between about −2° and about −3°. As illustrated, in certain exemplary implementations, the ratio between the span (Ssoo) and chord length (Chsoo) is operable to improve the stability of the UAV, and may depend on, for example, design parameter such as the length of rotor blade (preventing flow distortion), maintain the optimal air gap, as well as the fixed wing assembly comprised of structural member 300 and second wings 400, 400', and their span.

In an exemplary implementation, the UAV disclosed, is used as an autonomous UAV having VTOL capabilities. Accordingly, provided herein is an autonomous VTOL UAV 10 comprising: a first autopilot module transceiving (in other words, operable to transmit and receive) UAV rotor control signals; a second autopilot module receiving fixed wing control signals; an integrator module; and an on-board central processing module (CPM) in communication with the first autopilot module, the second autopilot module, and the integrator module, the CPM comprising at least one processor, and being in further communication with a non-transitory memory device storing thereon a set of executable instructions, configured, when executed to cause the at least one processor to automatically: transceive the rotor control signals; receive the fixed wing control signals; using the integrator module, calculate control signals to be applied to the VTOL UAV; and apply said calculated control signals to said VTOL UAV rotor controls. Consequently, VTOL UAV comprises: pair of elongated arcuate drivetrain members 100, 100', each having basal end 101, 101' and apical end 102, 102' and each defining basal 1001, 1001', mid 1002, 1002', and apical 1003, 1003' inflection points; fuselage 200; structural member 300 defining longitudinal axis XL, having upper surface 3006 and basal surface 3007, with pair of lateral ends 3001, 3002 extending laterally from fuselage 200 and coupled to each of elongated arcuate drivetrain members 100, 100' at each lateral end 3001, 3002 respectively. Pair of second wings 400, 400' are operably coupled to, and extending laterally from each elongated arcuate drivetrain members 100, 100', each second wing 400, 400' operably coupled to structural member 's 300 longitudinal axis A/, (e.g., through a pair of tubes operable to be accommodated in apertures 1009 A, 1009B and 1009A', 1009B' (see e.g., FIG. 2)). Rear horizontal inverted airfoil 500, having apical surface 5001 and basal surface 5002 spanning gap between pair of elongated arcuate drivetrain members 100, 100', with lateral ends 5005, 5005' coupled to pair of elongated arcuate drivetrain members 100, 100' at apical inflection point 1003 mounting 1006, wherein structural member 300, pair of second wings 400, 400' together (with tubes 321A, 321B, 321A', 321B', 322A, 322B, 322A', 322B' [not shown]) coupling each of second wings 400, 400' to structural member 300 through apertures 1009A, 1009B and 1009A', 1009B' defined in elongated arcuate members 100, 100', for example passing through opening 1008 [see e.g., FIG. 2,] defined in elongated arcuate members 100, 100') form fixed wing assembly such that fixed wing assembly, and rear horizontal inverted airfoil 500 is operable to transmit plurality of control signals. In certain exemplary implementations, the plurality of fixed wing assembly control signals comprise, for example, at least one of: pressure, temperature, wind speed above the fixed wing, pitch angle, roll angle, and yaw angle, some of which can be transmitted using antennae 141, 142. Depending on the task, UAV 10 can further optionally comprise, stabilizing cross bar 130 having pair of lateral
ends 1300, 1300' coupled to corresponding elongated arcuate drivetrain member 100, 100' at basal inflection point 1001 (see e.g., FIG. 2, 1007), wherein each elongated drivetrain member 100, 100' further comprises first VTOL rotor 110, 110' extending apically from basal inflection point 1001, 100G and second VTOL rotor 120, 120' extending basally from elongated arcuate drivetrain member 100, 100' between mid inflection point 1002, 1002' and apical inflection point 1003, 1003', first 110, 110' and second 120, 120' rotor operable to transceive plurality of rotor control signals, the plurality of rotor control signal comprise at least one of: pressure, temperature, ground speed, revolution per minute (RPM), and altitude.

Optional stabilizing bar 130, is depicted having antennae 141, 142 coupled thereto, operable to transmit signals as needed to autopilot (see e.g., 230, FIG. 4C), as well as The UAV systems disclosed herein can be computerized systems further comprising a central processing module (CPM); a display module; and a user interface module. The Display modules, which can include display elements, which may include any type of element which acts as a display. A typical example is a Liquid Crystal Display (LCD). LCD for example, includes a transparent electrode plate arranged on each side of a liquid crystal. There are however, many other forms of displays, for example OLED displays and Bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing and the display module is protected from damage by a glass or plastic plate arranged over the display element and attached to the housing.

The term "communicate" (and its derivatives e.g., a first component "communicates with" or "is in communication with" a second component) and grammatical variations thereof are used to indicate a structural, functional, mechanical, electrical, optical, or fluidic relationship, or any combination thereof, between two or more components or elements. As such, the fact that one component is said to communicate with a second component is not intended to exclude the possibility that additional components can be present between, and/or operatively associated or engaged with, the first and second components. Furthermore, the term "electronic communication" means that one or more components of the multi-mode optoelectronic observation and sighting system with cross-platform integration capability described herein are in wired or wireless communication or internet communication so that electronic signals and information can be exchanged between the components.

Likewise, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. In an embodiment, an electronic control unit of the systems disclosed and claimed, is the electronic control module (ECM).

The term "computer-readable medium" as used herein, in addition to having its ordinary meaning, refers to any medium that participates in providing instructions to a processor for execution. Such a medium may take many forms, including but not limited to, non-volatile media and volatile media. Non-transitory media can be, for example, optical or magnetic disks, such as a storage device. Volatile media includes dynamic memory, such as main memory.

Memory device as used in the methods, programs and systems described herein can be any of various types of memory devices or storage devices. The term "memory device" is intended to encompass an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed (e.g., the UAV on-board CPM), and/or may be located in a second different computer [or micro controller, e.g., the ground control unit] which connects to the first computer over a network, such as cellular network, satellite, wireless network or their combination (Mesh networks). In the latter instance, the second computer may further provide program instructions to the first computer for execution. The term "memory device" can also include two or more memory devices which may reside in different locations, e.g., in different computers that are connected over a network.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stack(s) includes one or more stack). Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

Unless specifically stated otherwise, as apparent from the discussions, it is appreciated that throughout the specification discussions utilizing terms such as "processing," "loading," "in communication," "detecting," "calculating," "determining", "analyzing," "applying" or the like, refer to the action and/or processes of a computer or computing system, or similar electronic computing device, that manipulate and/or transform data represented as and to physical manifestation.

For the purposes of the present invention, directional or positional terms such as "top", "bottom", "upper," "lower," "side," "front," "frontal," "forward," "rear," "rearward," "back," "trailing," "above," "below," "left," "right," "horizontal," "vertical," "upward," "downward," "outer," "inner," "exterior," "interior," "intermediate," etc., are merely used for convenience in describing the various embodiments of the present invention. For example, the orientation of the embodiments shown in FIGS. 1-6 may be reversed or flipped over, rotated by 90 degrees in any direction, etc.

Accordingly and in an exemplary implementation, provided herein is an unmanned aerial vehicle (UAV) system configured for Vertical Take-Off and Landing (VTOL), comprising: an aircraft comprising: a pair of elongated arcuate drivetrain members, each having a basal end and an apical end and each defining a basal, mid, and apical inflection points; a fuselage; a structural member defining a longitudinal axis, having an upper surface and a basal surface, with a pair of lateral ends extending laterally from the fuselage and coupled to each of the elongated arcuate drivetrain members at each lateral end; a pair of second wings, operably coupled to, and extending laterally from each elongated arcuate drivetrain members; a rear horizontal inverted airfoil, having apical surface and a basal surface spanning the gap between the pair of elongated arcuate drivetrain members, with lateral ends coupled to the pair of elongated arcuate drivetrain members at the apical inflection point; and optionally, a stabilizing cross bar having a pair of lateral ends coupled to the corresponding elongated arcuate drivetrain member at the basal inflection point, wherein each elongated drivetrain member further comprises a first VTOL rotor extending apically from the basal inflection point and a second VTOL rotor extending basally from the elongated arcuate drivetrain member between the mid inflection point and the apical inflection point, wherein (i) each elongated arcuate drivetrain member further comprises a dorsal vertical stabilizer extending from the mid inflection point to the apical inflection point, and a ventral horizontal stabilizer disposed between the apical infection point and the apical end, (ii) further comprising a support member extending basally from the mid inflection, operable to form a level base plane, wherein (iii) the first VTOL rotor and the second VTOL rotor, each extend from the elongated arcuate drivetrain member at a predetermined deflection angle off vertical, and wherein the second VTOL rotor extends from the elongated arcuate drivetrain member at a larger deflection angle than the first VTOL rotor's deflection angle, wherein (iv) the structural member further defining a central region and a pair of lateral sections tapering away (in other words, becoming narrower the further the distance from) from the central region, wherein (v) the upper surface of the central region further defines a front portion and a rear portion, the rear portion further defining an opening, wherein (vi) the fuselage comprises: a basally open covering member; and a gondola (both forming a nacelle), (vii) the basally open covering member comprises a nose section, a canopy section and a backing section together defining a lip and wherein the lip forms an opening sized and adapted to accommodate the structural member between the basally open covering member and the gondola, (viii) the gondola comprises: a posteriorly open aft portion, forming a compartment operable to accommodate a power unit; an apically open fore portion, forming a payload chamber, the aft portion separated from the fore portion by a bulkhead, and wherein (ix) the rear horizontal inverted airfoil has a negative angle of attack, of between −1° and −5°.

In another exemplary implementation, provided herein is an autonomous VTOL UAV comprising: a first autopilot module transceiving (in other words, operable to transmit and receive) UAV rotor control signals; a second autopilot module receiving fixed wing control signals; an integrator module; and an on-board central processing module (CPM) in communication with the first autopilot module, the second autopilot module, and the integrator module, the CPM comprising at least one processor, and being in further communication with a non-transitory memory device storing thereon a set of executable instructions, configured, when executed to cause the at least one processor to automatically: transceive the rotor control signals; receive the fixed wing control signals; using the integrator module, calculate control signals to be applied to the VTOL UAV; and apply said calculated control signals to said VTOL UAV rotor controls, wherein (x) the VTOL UAV comprises: a pair of elongated arcuate drivetrain members, each having a basal end and an apical end and each defining a basal, mid, and apical inflection points; a fuselage; a structural member defining a longitudinal axis, having an upper surface and a basal surface, with a pair of lateral ends extending laterally from the fuselage and coupled to each of the elongated arcuate drivetrain members at each lateral end; a pair of second wings, operably coupled to, and extending laterally from each elongated arcuate drivetrain members, each second wing further operably coupled to the structural member; a rear horizontal inverted airfoil, having apical surface and a basal surface spanning the gap between the pair of elongated arcuate drivetrain members, with lateral ends coupled to the pair of elongated arcuate drivetrain members at the apical inflection point, wherein the structural member, pair of second wings, and the rear horizontal inverted airfoil form the fixed wing, wherein the fixed wing is operable to transmit a plurality of control signals; and optionally, a stabilizing cross bar having a pair of lateral ends coupled to the corresponding elongated arcuate drivetrain member at the basal inflection point, wherein each elongated drivetrain member further comprises a first VTOL rotor extending apically from the basal inflection point and a second VTOL rotor extending basally from the elongated arcuate drivetrain member between the mid inflection point and the apical inflection point, the first and second rotor operable to transceive a plurality of rotor control signals, wherein (xi) each elongated arcuate drivetrain member further (optionally) comprises a dorsal vertical stabilizer extending the mid inflection point to the apical inflection point, and (optionally) a ventral horizontal stabilizer disposed between the apical infection point and the apical end, (xii) as well as a support member extending basally from the mid inflection, operable to form a level base (tail) plane, wherein (xiii) the first VTOL rotor and the second VTOL rotor, each extend from the elongated arcuate drivetrain member at a predetermined deflection angle off vertical, and wherein the second VTOL rotor extends from the elongated arcuate drivetrain member at a larger angle than the first VTOL rotor and wherein the plurality of rotor control signal comprise at least one of: pressure, temperature, ground speed, revolution per minute (RPM), and altitude, wherein (xiv) the structural member further defining a central region and a pair of lateral regions tapering away from the central region; the upper surface of the central region further defines a front portion and a rear portion, the rear portion further defining an opening; the plurality of fixed wing control signals comprise at least one of: pressure, temperature, wind speed above the fixed wing, pitch angle, roll angle, and yaw angle, wherein (xv) the fuselage comprises: a basally open covering member; and a gondola, (xvi) the basally open covering member comprises a nose section, a canopy section and a backing section together defining a lip and wherein the lip forms an opening sized and adapted to accommodate the structural member between the basally open covering member and the gondola, (xvii) the gondola comprises: a posteriorly open aft portion, forming a compartment operable to accommodate a power unit, the compartment having an upper deck surface; an autopilot element, comprising the first autopilot module, the second autopilot module, the integrator module, a communication module, and a navigation module; and an apically open fore portion, forming a payload chamber, the aft portion separated from the fore portion by a bulkhead, and wherein (xviii) the rear horizontal inverted airfoil has a negative angle of attack, of between-1° and −5°

While the invention has been described in detail and with reference to specific exemplary implementations thereof, it will be apparent to one of ordinary skill in the art that various changes and modifications can be made therein without departing from the spirit and scope thereof. Accordingly, it is intended that the present disclosure covers the modifications and variations of this invention provided they come within the scope of the appended claims and their equivalents.

What is claimed:

1. An unmanned aerial vehicle (UAV) system configured for Vertical Take-Off and Landing (VTOL), comprising: an aircraft comprising:
    a) a pair of elongated arcuate drivetrain members, each having a basal end and an apical end and each defining a basal, mid, and apical inflection points, wherein each elongated arcuate drivetrain member further comprises a first VTOL rotor extending apically from the basal inflection point and a second VTOL rotor extending basally from the elongated arcuate drivetrain member between the mid inflection point and the apical inflection point;
    b) a fuselage;
    c) a structural member defining a longitudinal axis, having an upper surface and a basal surface, with a pair of lateral ends extending laterally from the fuselage and coupled to each of the elongated arcuate drivetrain members at each lateral end;
    d) a pair of fixed wings, operably coupled to, and extending laterally from each elongated arcuate drivetrain members;
    e) a rear horizontal inverted airfoil, having apical surface and a basal surface spanning a gap between the pair of elongated arcuate drivetrain members, with lateral ends coupled to the pair of elongated arcuate drivetrain members at the apical inflection point; and
    f) a stabilizing cross bar having a pair of lateral ends coupled to the corresponding elongated arcuate drivetrain member at the basal inflection point.

2. The UAV system of claim 1, wherein each elongated arcuate drivetrain member further comprises a dorsal vertical stabilizer extending from the mid inflection point to the apical inflection point, and a ventral horizontal stabilizer disposed between the apical infection point and the apical end.

3. The UAV of claim 2, wherein each elongated arcuate drivetrain member further comprises a support member extending basally from the mid inflection, operable to form a level base plane.

4. The UAV of claim 3, wherein the first VTOL rotor and the second VTOL rotor, each extend from the elongated arcuate drivetrain member at a predetermined deflection angle off vertical, and wherein the second VTOL rotor extends from the elongated arcuate drivetrain member at a larger deflection angle than the first VTOL rotor's deflection angle.

5. The UAV of claim 4, further comprising:
    a) a first autopilot module transceiving UAV rotor control signals;
    b) a second autopilot module receiving fixed wing control signals;
    c) an integrator module; and
    d) an on-board central processing module (CPM) in communication with the first autopilot module, the second autopilot module, and the integrator module, the on-board CPM comprising at least one processor, and being in further communication with a non-transitory memory device storing thereon a set of executable instructions, configured, when executed to cause the at least one processor to automatically:

i. transceive the rotor control signals;
ii. receive the fixed wing control signals;
iii. using the integrator module, calculate control signals to be applied to the VTOL UAV; and
iv. apply said calculated control signals to said VTOL UAV rotor controls.

6. The UAV system of claim 5, wherein,
the plurality of fixed wing control signals comprise at least one of: pressure, temperature, wind speed above the fixed wing, pitch angle, roll angle, and yaw angle.

7. The UAV system of claim 5, wherein the plurality of rotor control signals comprise at least one of: pressure, temperature, ground speed, revolution per minute (RPM), and altitude.

8. The UAV of claim 1, wherein the structural member further defining a central region and a pair of lateral sections tapering away from the central region.

9. The UAV of claim 8, wherein the upper surface of the central region further defines a front portion and a rear portion, the rear portion further defining an opening.

10. The UAV of claim 1, wherein the fuselage comprises:
a. a basally open covering member; and b. a gondola.

11. The UAV of claim 10, wherein the basally open covering member comprises a nose section, a canopy section and a backing section together defining a lip and wherein the lip forms an opening sized and adapted to accommodate the structural member between the basally open covering member and the gondola.

12. The UAV of claim 11, wherein the gondola comprises:
a) a posteriorly open aft portion, forming a compartment operable to accommodate a power unit; and
b) an apically open fore portion, forming a payload chamber, the aft portion separated from the fore portion by a bulkhead.

13. The UAV of claim 1, wherein the rear horizontal inverted airfoil has a negative angle of attack, of between $-1°$ and $-5°$.

14. The UAV of claim 1, wherein the UAV's center of gravity (COG) during vertical takeoff and landing is disposed directly beneath an intersection of projected diagonals drawn through the rotational axes of the first VTOL rotor and the second VTOL rotor in each elongated arcuate drivetrain member.

* * * * *